Jan. 19, 1960

K. FREUND 2,921,509

MULTIPLE EXPOSURE CAMERA

Filed Oct. 24, 1955

KARL FREUND
INVENTOR.

BY

ATTORNEY.

Jan. 19, 1960 K. FREUND 2,921,509
MULTIPLE EXPOSURE CAMERA
Filed Oct. 24, 1955 2 Sheets-Sheet 2
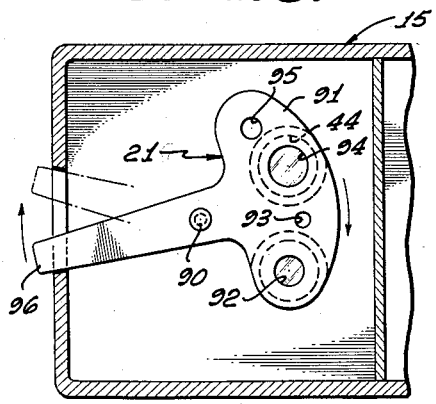
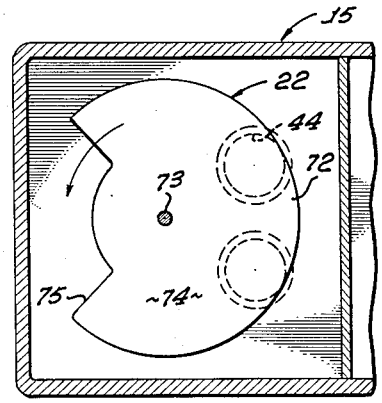
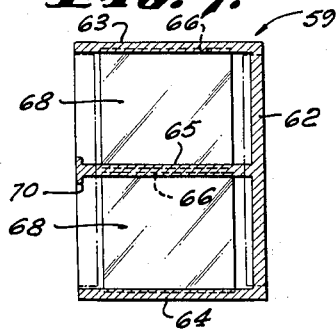
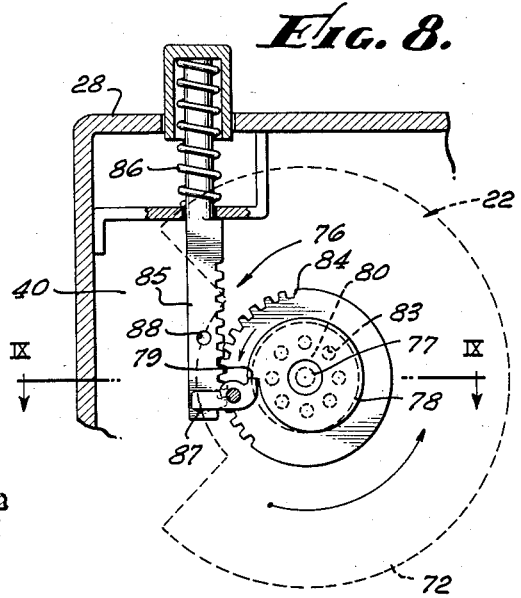
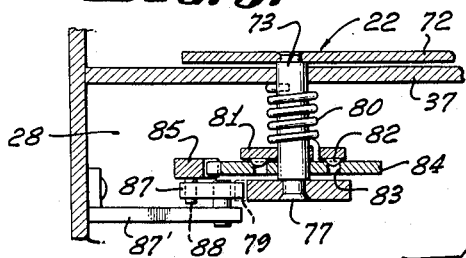
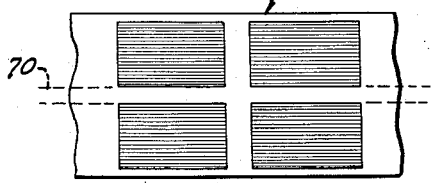
KARL FREUND
INVENTOR.
BY
ATTORNEY.

United States Patent Office 2,921,509
Patented Jan. 19, 1960

2,921,509
MULTIPLE EXPOSURE CAMERA
Karl Freund, San Fernando, Calif.

Application October 24, 1955, Serial No. 542,361

4 Claims. (Cl. 95—18)

This invention relates to a camera for simultaneously producing a plurality of separate latent photographic images of a single field of view upon a single photographic film. More particularly, this invention relates to such a camera wherein each such photographic image is produced by exposure to a different intensity of light to assure that at least one image on said film is properly exposed.

The camera of this invention is designed particularly for those persons who want to take good pictures, in terms of exposure, but who do not want to first learn technical details of film speed, aperture size, shutter speed, depth of field, over and under exposure and causes thereof, exposure meters and tables and the like. Such persons may include the novice who is being first introduced to photography and others who do not wish to spend the time necessary to understand basic techniques of photography.

This invention contemplates a camera which does not require for its operation a knowledge of use of exposure meters or exposure tables, aperture size, and the like to produce excellent photographic results. Generally speaking, the camera of this invention provides means for producing a plurality of latent photographic images in adjacent relation on a single photographic film, each image being formed by exposure to a different light intensity, the overall exposure range being sufficiently wide to produce at least one image properly exposed in the presence of greatly different conditions of illumination.

The primary object of this invention therefore is to provide and design a novel multiple exposure camera of simple construction and operation and which will produce a properly exposed photographic image without precise predetermination of conditions of illumination of the subject to be photographed.

An object of this invention is to provide a multiple exposure camera which utilizes a single photographic film supported therein in novel manner.

Another object of this invention is to provide a camera utilizing two or more lenses of identical focal length and a diaphragm having an aperture positioned on an optical axis of each lens, each aperture materially differing in size.

Another object of this invention is to provide a multiple exposure camera having a lens means and a diaphragm as above wherein light splitting means are operatively positioned on the optical axis of each lens to transmit and reflect different amounts of light received to different film portions of a single photographic film.

A further object of this invention is to design and provide a multiple exposure camera having means for selectively and simultaneously changing apertures positioned on the lens axes to other apertures differing in size.

A still further object of this invention is to provide a camera such as described above which may use black and white or color photographic film and which may be provided with built-in sun shade means.

Many other objects and advantages of this invention will be readily apparent to those skilled in the art from the following description of the drawings in which an exemplary embodiment of this invention is shown.

In the drawings:

Fig. 5 is a front view of a diaphragm provided with apertures and used in the camera.

Fig. 6 is a front view of a shutter plate.

Fig. 7 is a back elevational view of a support for the light-splitting means.

Fig. 8 is a fragmentary sectional view of the shutter-actuating mechanism.

Fig. 9 is a horizontal section taken along plane IX—IX in Fig. 8.

Fig. 10 is a plan view typifying an arrangement of four simultaneously taken image areas by the camera of this invention.

Figure 1:
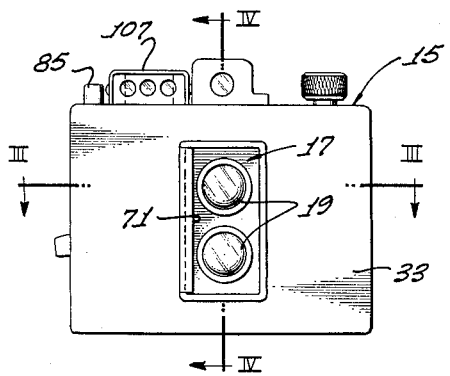
Fig. 1 is a front view of a camera embodying this invention.
Figure 2:
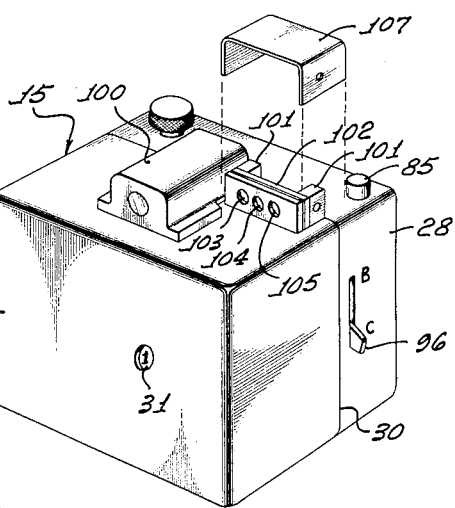
Fig. 2 is a top rear perspective view of the camera, the hood portion being shown in exploded position.
Figure 3:
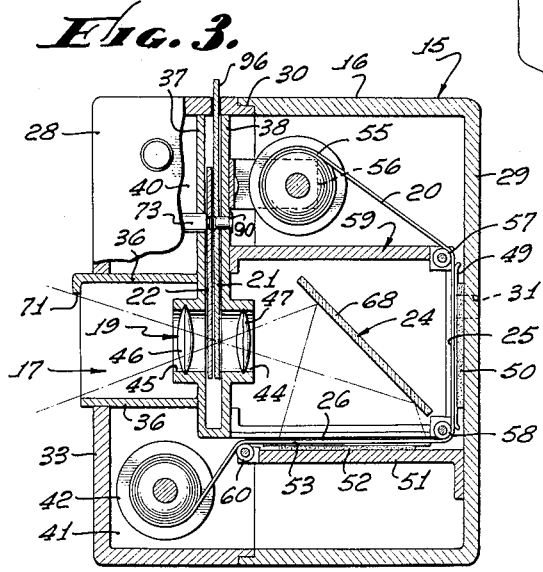
Fig. 3 is a horizontal section taken in the plane III—III in Fig. 1.
Figure 2A:
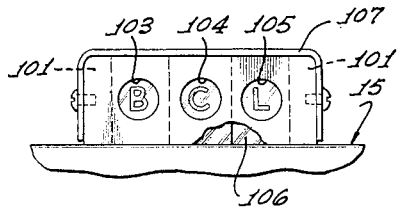
Fig. 2a is an enlarged view of the light-gauging means.
Figure 4:
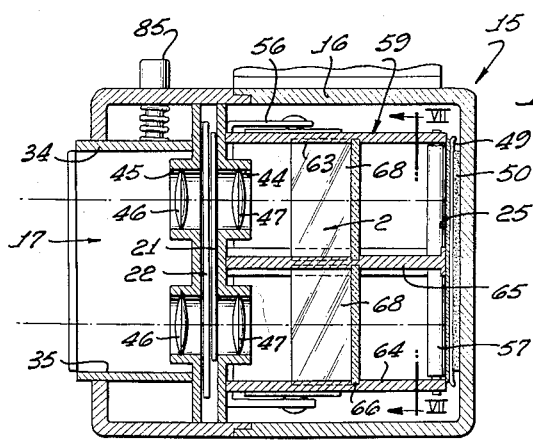
Fig. 4 is a vertical section taken along the plane IV—IV in Fig. 1.

Generally speaking, a camera 15 embodying this invention may comprise a hollow housing 16, the front of said housing being provided with an elongated recess 17. A pair of closely adjacent lenses 19 are mounted in said recess 17 and direct light to a single continuous photographic film strip 20 mounted in the focal plane of said lenses. Between elements of each lens 19 may be pivoted diaphragm means 21 and a shutter means 22, said diaphragm means being provided with sets of apertures of different size and adapted to be positioned on the optical axes of said lenses 19. Light splitting means 24 are positioned on the optical axes of said lenses to transmit part of the light to a film portion 25 and to reflect part of the light from each lens to a film portion 26 disposed at right angles to film portion 25. Light passing through each lens 19 thus exposes two adjacent areas of film 20 to different light intensities and the exposure of film 20 by one lens is different from the exposure by the other lens because for a given setting of the diaphragm means 21, apertures of different size are interposed in the optical axis of each lens 19 (when said lenses are of equal speed) or when the lenses are of different speeds and then the apertures can be of substantially equal size. In this example, a total of four lateral photographic images are produced, each at a different exposure.

The camera housing 16 may be of any suitable shape and configuration and in this example may include a front housing portion 28 and a rear housing portion 29, said housing portions meeting along side walls thereof as at 30 and being secured in any well known manner. The back housing portion 29 may be readily removable for access to the interior of the camera for facilitating loading of a film therein. The back wall of the rear housing portion may be provided with a window 31 to read the number of exposures made and to position the film in usual manner.

The front housing portion 28 includes a front wall 33 having a centrally disposed elongated opening to receive in light-tight relation top, bottom and side recess walls 34, 35 and 36 respectively, which define recess 17. The recess walls 34, 35 and 36 may be secured to a front interior partition 37 and to front wall 33 in any suitable manner. Closely spaced inwardly of partition 37 is a second partition 38, said partitions extending between top and bottom walls of housing portion 28 and one side wall thereof. There is thus formed in housing portion 28 a compartment 40 to accommodate a shutter release mechanism and an open space 41 at the opposite side of recess 17 and within which may be mounted in well known manner a take-up spool 42 for film 20.

The internal partitions 37 and 38 are each provided with a pair of spaced aligned ports 44 and 45 within which may be suitably mounted in well known manner the pair of objective lenses 19, each lens 19 including relatively closely spaced lens elements 46 and 47. For purposes of illustration the spacing apart of the lens elements 46 and 47 is exaggerated in order to more clearly show the position and mounting of diaphragm 21 and shutter 22. Lenses 19 are provided with identical focal lengths and preferably, for economy, may be provided with different relative speeds.

Means for positioning the single photographic film 20 in the focal plane of both of said lenses 19 may comprise a thin shim plate 49 having a flat planar polished surface to engage the back of the film, said plate 49 being supported on a pad 50 of felt or other suitable soft material carried by the back wall of housing portion 29. Means to support an adjacent film portion 26 at right angles to the film portion 25 may include a forwardly directed member 51 secured to the back wall of housing portion 29 and provided with a pad 52 and thin shim plate 53 having a polished flat surface disposed at right angles to plate 49.

The film 20 is also supported within the camera housing by a supply spool 55 releasably pivotally mounted between a pair of spaced spring members 56 secured in suitable manner to interior partition 38. Also supporting and guiding film 20 may be idle rollers 57 and 58 carried by light splitting support means 59 constructed as later described. The forwardly extending wall 51 may carry an idle roller 60 at its forward end to guide the film onto the take-up spool 42.

It will thus be apparent that when the back housing portion 29 is removed, film 20 may be conveniently passed over idle rollers 57, 58 and the take-up spool positioned in the front housing portion in well known manner. A slight amount of slack is permitted in the film so that when back housing portion 29 is assembled with the front housing portion 28 idle roller 60 and shim plate 53 will properly position film portion 26 at right angles to film portion 25.

The light-splitting support means 59 may include a rearwardly extending vertical wall 62, top and bottom walls 63 and 64, and an intermediate wall 65 disposed in a plane between lenses 19. The top and bottom walls 63 and 64 and wall 62 may be secured to the internal partition 38 in any suitable manner. Opposed internal faces of walls 63, 64 and 65 may be provided with opposed aligned grooves 66 lying in a vertical plane disposed at 45° to the optical axes of lenses 19. In these aligned grooves may be positioned a pair of elongated rectangular light-splitting members 68. Each light-splitting member 68 is operatively positioned with respect to the optical axis of a lens 19 and transmits a portion of light admitted by the lens to film portion 25 and reflects another portion of said light to film portion 26. The transmission-reflection ratio of each light-splitting member 68 in this example may be identical and may have a ratio between 1:2 to 1:16. It is understood that the selected transmission reflection ratio for each light-splitting member 68 may be different in order to modify the light intensity as desired. It is desirable to transmit less light and to reflect more light so that the second surface of the light-splitting member will not reflect sufficient light to produce ghost images on film portion 26.

Intermediate wall 65 may be provided with a vertically extending peripheral lip 70 to produce an unexposed longitudinal center strip on film 20 dividing film 20 longitudinally so as to clearly separate film portions exposed by each lens 19. In this example film 20 may be standard film of size 120, the center strip produced by lip 70 providing two longitudinal film strips of approximately 35 mm. size. Thus four 35 mm. exposures are produced.

It will be noted that roller 58 is supported from top and bottom walls 63 and 64 with its axis of rotation generally in line with the plane of the light-splitting members 68. The intermediate wall 65 may be relieved to accommodate the central portion of roller 58.

It will be apparent that light entering lens 19 cannot be permitted to fall directly on rear margins of film portion 26. To eliminate any direct impingement of light against film portion 26, the recess wall on the side of lens 19 opposite to film portion 26 may be extended or, as in this example, provided with an inturned light masking edge 71 which limits light admitted to impingement on light-splitting members 68. The provision of recess 17 in the front wall of the housing with lenses 19 recessed therein not only facilitates the construction of the camera housing for this above purpose but also protects the lens and provides a sun shade therefor. If desired a lens cover (not shown) may be hinged to one recess side wall to close the front opening of the recess when the camera is not in use.

The shutter means 22 employed in this invention is simultaneously operable with respect to each lens, is of a single selected speed such as $\frac{1}{50}$ of a second, and if of substantially identical exposure time characteristics. In Fig. 6, the shutter means 22 may include a single thin lightweight shutter plate 72 pivotally mounted at 73 to internal partition 37. The shutter plate may be generally circular and provides an opaque portion 74 which normally covers ports 44 and 45, said shutter plate being positioned between partitions 37 and 38. A sector-shaped opening 75 is provided in plate 72 to admit light for a preselected time interval upon rotation of the shutter plate at the preselected speed.

Shutter release means generally indicated at 76 may be of any well known construction and in this example may comprise a shaft 77 secured to plate 72, journaled in partition 37, and carrying a cam element 78 provided with a shoulder 79. A shutter coil spring 80 ensleeved over shaft 77 may be secured at one end to shaft 77 and at its other end to a rotatable disk 81 provided with depending detents 82 adapted to releasably interlock with aligned spaced openings 83 in a gear disk 84. The teeth of gear disk 84 mesh with a shutter release rack bar 85 which is biased upwardly by a spring 86. A pivoted dog 87 is supported from a bracket 87' carried by partition 37, said dog 87 releasably engaging shoulder 79 and holding the shutter plate against rotation during winding of spring 80. The rack bar 85 includes a pin 88 which engages dog 87 to release cam element 78 for rotation of the shutter plate for one revolution.

When the shutter release button 90 is pressed downwardly rack bar 85 engages gear plate 84 to wind spring 80 to a selected tension. When pin 88 on the rack bar engages dog 87, cam element 78 is released and the shutter is rotated for one revolution, dog 87 re-engaging shoulder 79 to prevent further turning.

The diagram 21 may be pivotally mounted at 90 from partition 38 for rotation about the same axis as shutter plate 72. The diaphragm 21 includes a generally semicircular opaque thin plate 91 which extends simultaneously over both of aligned ports 45, 55 in partitions 37 and 38. Plate 91 may be provided with a set of apertures of selected different size for each lens 19. In this example, a set of apertures 92 and 93 of ⅜ inch and 3/16 inch diameters respectively may be provided for lower lens 19. The upper lens 19 may be provided with a set of apertures 94 and 95 having diameters of ½ inch and ¼ inch respectively. The larger apertures of each set are provided for use with color film and the smaller apertures for use with black and white film.

Aperture plate 91 also includes a sidewardly extending arm 96 which projects through a slot in the side wall of front housing portion 28. On the surface of the housing side wall may be provided two marks, namely, "C" and "B," the "C" for color, and the "B" for black and white film. In the position shown the diaphragm 21 is positioned for color, the larger of each set of apertures 92 and 94 being operatively positioned on the axes of both lenses. When the aperture plate is pivoted so that the arm 96 is positioned opposite B, then the smaller apertures 93 and 95 are operatively positioned on the axes of both lenses for exposure of black and white film.

On the top of the camera housing may be provided a view finder 100 of well known construction. To one side of view finder 100 may be provided a pair of laterally spaced upstanding posts 101 which may support an elongated transversely disposed member 102 provided with three adjacent openings 103, 104 and 105. In openings 103, 104 and 105 may be positioned a transparent element having etched thereon in any suitable manner a selected letter of the alphabet. In this example, letters B, C and L are used. Positioned forwardly of openings 103, 104 and 105 may be a strip of light filter material 106, said filter strip carrying selected neutral density filters. The density filter positioned with respect to opening 103 and letter B is selected so that if the letter B can be read, illumination of the subject to be photographed is sufficient for using black and white film. Similarly if letter C can be read through opening 104, light is sufficient for using color film. If the letter L cannot be read, then illumination is insufficient for taking of any pictures. If the letter B cannot be read but L can be read, then by positioning the aperture plate to color film position, pictures on black and white film may be taken.

An elongated hood 107 covers member 102 and posts 101 and extends forwardly and rearwardly thereof and is of sufficient length so that the light admitted to the openings 103, 104 and 105 from the front of the hood is generally limited to light from the subject to be photographed. The hood 107 can be extended rearwardly to substantially the rear edge of the camera and be there provided with a resilient, rubber-like edging to permit the eye of the user to be comfortably placed in close proximity thereto, the hood thereby eliminating side light and permitting the letters to be observed by light received only from the field of view. Or an eye cup and magnifying lens assembly can be movably mounted on the top of the camera to permit obervation of the letters which become visible by transmitted light.

It will be understood by those skilled in the art that the relationship of the different aperture sizes and transmission reflection ratio of the light-splitting members 68 may be selected so that a selected exposure range may be covered to include greatly different conditions of illumination. The exposure of the film areas of film portions 25 and 26 may be at predetermined equally spaced exposure intervals differing, for example, by 1½.

In typical operation of the multiple camera of this invention assuming that black and white film is in the camera and that the letter B may be read in the illumination measuring device on top of the camera housing, the diaphragm 21 is positioned with its arm at mark "B" on the side of the camera. In this position apertures 93 and 95 are operatively positioned over the axes of lenses 19. Pressing of the shutter release button will simultaneously admit light for the same time interval through apertures 93 and 95 and in different intensities as determined by the aperture sizes. Light impinging on light-splitting members 68 is further modified in intensity because unequal parts of light are transmitted and reflected thereby. Four latent images are thus simultaneously produced and may vary in exposure as if they were taken by exposures of about F. 4.5, F. 6.3, F. 9 and F. 12.3. One of these will be an excellent image.

If color film is used the diaphragm 21 is merely set to mark "C" on the side of the housing, apertures 92 and 94 being thus operatively positioned on axes of lenses 19. It is understood that the letter C can be read in the opening 104 in the device at the top of the camera.

After development of an entire strip of continuous film, the best negative of each set of four simultaneous exposures can be readily and visually selected and identified by a notch cut in the outer margin of the strip opposite the selected negative. If desired, the entire strip can be then cut longitudinally through the unexposed separating area to thereby produce two companion strips capable of being readily handled by normal projection printers for the production of black and white positives of only the negatives identified by such edge notches. In terms of proper exposure, a user of a camera of this invention is assured of securing excellent photographic reproduction of each subject photographed.

The camera of this invention thus embodies a novel construction of a camera housing and means for positioning a film to receive light having a plurality of materially different light intensities. Means to modify the intensity of light admitted by a lens is also provided in a simple effective fool-proof manner. Any desired type of shutter mechanism capable of virtually simultaneously acting on both lenses can be used instead of the specific form described. In a simplified version only one lens can be used, the light splitter producing two images differing in contrast.

Various modifications and changes may be made in the camera of this invention and all such changes coming within the scope of the appended claims are embraced thereby.

I claim:

1. In a camera adapted to simultaneously produce a plurality of separate latent photographic images of a single field of view, each of the images having different depths of field and formed by exposure to a different intensity of light, comprising in combination: a camera housing provided with front and rear housing portions, said front housing portion being provided with a recess defined by walls extending inwardly from the front of the camera housing; a film reel in the front housing portion adjacent to the recess; another film reel carried by the front housing portion and extending into the rear housing portion; a pair of fixed lenses at the rear of said recess; a single aperture plate at the lenses provided with a different size aperture opening for each one of the pair of lenses; said front housing portion including a plurality of spaced rearwardly extending parallel walls defining spaced light-transmitting chambers one for each lens; a light-transmitting and reflecting means within each chamber and arranged at an angle to the axis of the associated lens; and means carried by the rear housing portion to support film portions in the path of both transmitted and reflected light, one of the said walls defining on the film portions a narrow unexposed longitudinal band separating exposed portions of the film.

2. A camera as stated in claim 1 wherein said means carried by the rear housing portion to support the film portions includes surfaces arranged at right angles to each other.

3. A camera as stated in claim 2 wherein one of the walls defining the recess in the front housing portion includes an extension limiting the field of view of said lenses whereby light reflected from said light-transmitting and reflecting means falls only on that portion of the film lying at right angles through the film portion receiving transmitted light.

4. In a camera adapted to simultaneously produce on a strip of film a plurality of separate latent photographic images of a single field of view, each of the images having different depths of field and formed by exposure to a different intensity of light, comprising in combination: a camera housing provided with front and rear housing portions, said front housing portion being provided with a recess defined by walls extending inwardly from the front of the camera housing; a pair of spaced film reels carried by the front housing portion for said strip of film; a pair of spaced fixed lenses carried by the front housing portion at the rear of said recess; a single aperture plate at said pair of lenses, said plate being provided with a different size aperture opening for each one of the pair of lenses; said front housing portion including a plurality of spaced, rearwardly extending walls defining spaced light transmitting chambers, one for each lens; a light transmitting and reflecting means within each chamber and arranged at an angle to the axis of the associated lens, said light transmitting and reflecting means in said chambers having different transmission-reflection ratios whereby light directed therefrom has different light intensities; and means carried by the rear housing portion to support film portions in the path of light transmitted and reflected by each light transmitting and reflecting means.

References Cited in the file of this patent

UNITED STATES PATENTS

| | | |
|---|---|---|
| 2,317,612 | Huebner | Apr. 27, 1943 |
| 2,341,480 | Schusterman | Feb. 8, 1944 |
| 2,361,661 | Sparling | Oct. 31, 1944 |
| 2,379,103 | Rath | June 26, 1945 |
| 2,386,276 | Simjian | Oct. 9, 1945 |
| 2,476,576 | Bachelder | July 19, 1949 |
| 2,478,301 | Mourfield | Aug. 9, 1949 |
| 2,541,555 | Sorkin | Feb. 13, 1951 |